(12) United States Patent
Dancasius et al.

(10) Patent No.: US 7,318,605 B2
(45) Date of Patent: Jan. 15, 2008

(54) KNEE SUPPORT ELEMENT FOR MOTOR VEHICLE

(75) Inventors: Michael Dancasius, Wuppertal (DE); Achim V. Der Muehlen, Wuppertal (DE); Stephen Pitrof, Bellbrook, OH (US)

(73) Assignee: Delphi Technologies Inc., Troy, MI (US)

( * ) Notice: Subject to any disclaimer, the term of this patent is extended or adjusted under 35 U.S.C. 154(b) by 197 days.

(21) Appl. No.: 10/999,028

(22) Filed: Nov. 30, 2004

(65) Prior Publication Data
US 2006/0113781 A1 Jun. 1, 2006

(51) Int. Cl.
*B60R 21/045* (2006.01)
(52) U.S. Cl. .................... 280/752; 280/730.1
(58) Field of Classification Search ............ 280/728.1, 280/728.2, 728.3, 732, 743.1, 743.2, 730.1, 280/751, 752, 753, 729; 297/488; 296/70
See application file for complete search history.

(56) References Cited

U.S. PATENT DOCUMENTS

| | | | | |
|---|---|---|---|---|
| 4,709,943 A | * | 12/1987 | Yoshimura et al. | 280/751 |
| 5,370,417 A | * | 12/1994 | Kelman et al. | 280/751 |
| 2003/0057760 A1 | * | 3/2003 | Horsch | 297/423.41 |
| 2005/0001416 A1 | * | 1/2005 | Muramatsu et al. | 280/752 |
| 2005/0194773 A1 | * | 9/2005 | Yamada et al. | 280/752 |

* cited by examiner

*Primary Examiner*—Paul N. Dickson
*Assistant Examiner*—Tiffany L. Webb
(74) *Attorney, Agent, or Firm*—James C. Lydon

(57) ABSTRACT

Knee support element for motor vehicles for absorbing energy in a knee region in case of a crash of the vehicle, including a first deformation element for absorbing energy upon impact of the knees in a first impact zone and a second deformation element for absorbing energy upon impact of the knees in a second impact zone, where the first deformation element is linked to the second deformation element in order to deform the second deformation element and thereby limit the resistance of the second deformation element against deformation, upon impact on the first impact zone.

19 Claims, 11 Drawing Sheets

KNEE SUPPORT ELEMENT FOR MOTOR VEHICLE

BACKGROUND OF THE INVENTION

The present invention relates to a knee support element for motor vehicles or absorbing energy in the knee region in case of a crash of the vehicle.

Knee support element according to the present invention is positioned between a support element of a motor vehicle and an element such as the instrument panel facing the cabin of the motor vehicle.

The knee support element is typically positioned in between the cross car beam (CCB) and the instrument panel (IP) of a vehicle.

During a frontal crash of a car, in case the driver and/or the passenger sitting next to the driver, are not wearing a safety belt, the knees region absorbs an important amount of energy. During the crash the knees will move towards the instrument panel and have an impact on the instrument panel. Underneath the instrument panel energy absorbing brackets will be present to absorb the energy of the incoming knees.

Regulations according to the energy absorption of the instrument panel and the underlying brackets can be found for unbelted dummies in the American standards USFM-VSS208.

There are a wide range of possible knee contact points with the instrument panel as well as different knee impacts directions which needs to be covered by using appropriate support brackets. In the prior art it is customary to work with dummies with different sizes. The energy absorbing brackets should be capable of absorbing a sufficient amount of energy in case of a frontal crash with any unbelted dummy.

In the present text, references will be made to different dummies being the 5%, 50% and 95% dummy. The 5% dummy represents relatively small driver. The knees of the unbelted dummy will have impact on a relatively low point of the instrument panel. The 50% dummy represents an average driver. The 50% dummy represents an impact of the mid section of the instrument panel. A 95% dummy represents a relatively tall driver. The 95% dummy will have an impact on a relatively high part of the instrument panel. The brackets should be adapted to ensure that the forces and the moments which occur in the femur and the tibia of a driver during impact are not allowed to exceed a certain value. These values are limited by European, US, Japanese and comparable safety regulations and norms.

In the prior art a knee support for a motor vehicle is known with a cross section which resembles a L. These brackets are known from the American patent application US2003/0057692 (Horsch et al.).

The knee support according to the prior art is positioned in order to have the relatively long part of the L connected to the CCB wherein this long part faces in is directed towards the passenger cabin. The smaller leg of the L points downwards. The bracket according to the prior art is positioned in order to have the connection between the two legs of L in the 50% dummy region. That means that upon impact of a 50% dummy an optimal absorption of energy is possible. As shown in FIG. 5 of US2003/0057692 in the mid section the brackets are only connected to the CCB with the relatively long part of the L. This means that the bracket is not suitable of absorbing a relatively large amount of energy upon impact of a 5% dummy. The bigger the size of the car, thereby the longer the leg of the L facing downward, the more difficult it will be to ensure upon impact a high energy absorption of the 5% dummy.

BRIEF SUMMARY OF THE INVENTION

It is an object of the present invention to provide a knee support according to the introduction, wherein the knee support element is capable of providing suitable energy absorption for the 50%, 5% and the 95% dummy.

The object is achieved in that the knee support element comprises a first deformation element for absorbing energy upon impact of the knees in a first impact zone, and a second deformation element for absorbing energy upon impact of the knees in a second impact zone, wherein the first deformation element is linked to the second deformation element in order to deform the second deformation element and thereby limit the resistance of the second deformation element against deformation, upon impact on the first impact zone. It is possible that the first deformation element is linked to the second deformation element in order to deform and thereby displace the second impact zone upon impact on the first impact zone.

It is possible that the first and the second deformation elements are linked in order to move the second deformation element in direction away from the tibia upon impact of the knees on the first impact zone.

The knee support element according to the present invention has the effect that the first deformation element can be positioned in a motor vehicle in order to provide optimal energy absorption for a 50% dummy. The second deformation element can be positioned in a motor vehicle in order to provide optimal energy absorption for a 5% dummy. The impact zone of the first and the second deformation element can be connected by means of a force distribution plate which is elongated in order to also provide sufficient absorption for a 95% dummy.

The first and the second deformation element are linked in order to have a displacement of the second impact upon impact on the first impact zone. This feature is added because of the fact that upon impact of the knees in the first impact zone the presence of the second deformation element is positioned in the impact zone of the tibia of the 50% dummy. The presence of the second element might lead to excess of the forces and moment exerted on the tibia above the regulations and norms. Upon impact on the first impact zone the linkage between the first deformation element and the second deformation element will cause a deformation of the second deformation element, which deformation will move the second impact zone away from the tibia. That means that the linkage will avoid fracture of the tibia upon impact of the knee in the first impact zone.

According to the present invention it is possible that the first deformation element and the second deformation element are a first part and a second part of a single support bracket.

In order to fine tune the resistance of the first and/or the second deformation element it is possible that at least one of the first and second deformation element is provided with notches, in order to tune the resistance of the first and/or second deformation element by altering the dimensions of the notches.

According to the present invention it is possible that the first and the second deformation element comprise one single material. Alternatively it is possible that the first and the second deformation element comprise a first and a second material.

Each or one of the deformation elements might comprise one of the following materials: steel, aluminium, magnesium, plastic, composites, foam, rubber or any suitable material or combinations of those materials.

It is possible that the first and/or second deformation element comprise a spring.

According to the present invention it is possible that the first deformation element is provided with connecting means for connecting the first deformation element to a support element of a motor vehicle. Thereby it is possible that the second deformation element is provided with connecting means for connecting the second deformation element to a support element of a motor vehicle. Alternatively it is possible that the first and second deformation element are provided with a single connecting element for connecting the first and the second deformation element to a support element of a motor vehicle.

It is possible that the first and/or second deformation element is connected to the cross-car-beam (CCB).

It is possible that the first and/or second deformation element is connected to the car body.

It is possible that the first and/or second deformation element connected to a deformable bracket which is attached to the cross-car-beam, or the car body.

It is possible that the support bracket is produced by means of moulding.

According to the invention it is possible that the first impact zone and the second impact zone are linked by means of a force distribution plate. The impact zones can also be integrated in the force distribution plate. Thereby it is possible that force distribution plate is formed by an instrument panel (IP) of the vehicle.

The present invention also relates to a motor vehicle, such as a car, comprising a knee support element wherein the knee support element is positioned in order to place the first impact zone in the 50% impact area and wherein the second impact zone is placed in the 5% impact area.

BRIEF DESCRIPTION OF THE DRAWINGS

The invention will now be described with reference to the drawings, wherein.

DETAILED DESCRIPTION OF THE PREFERRED EMBODIMENTS

Figure 1:
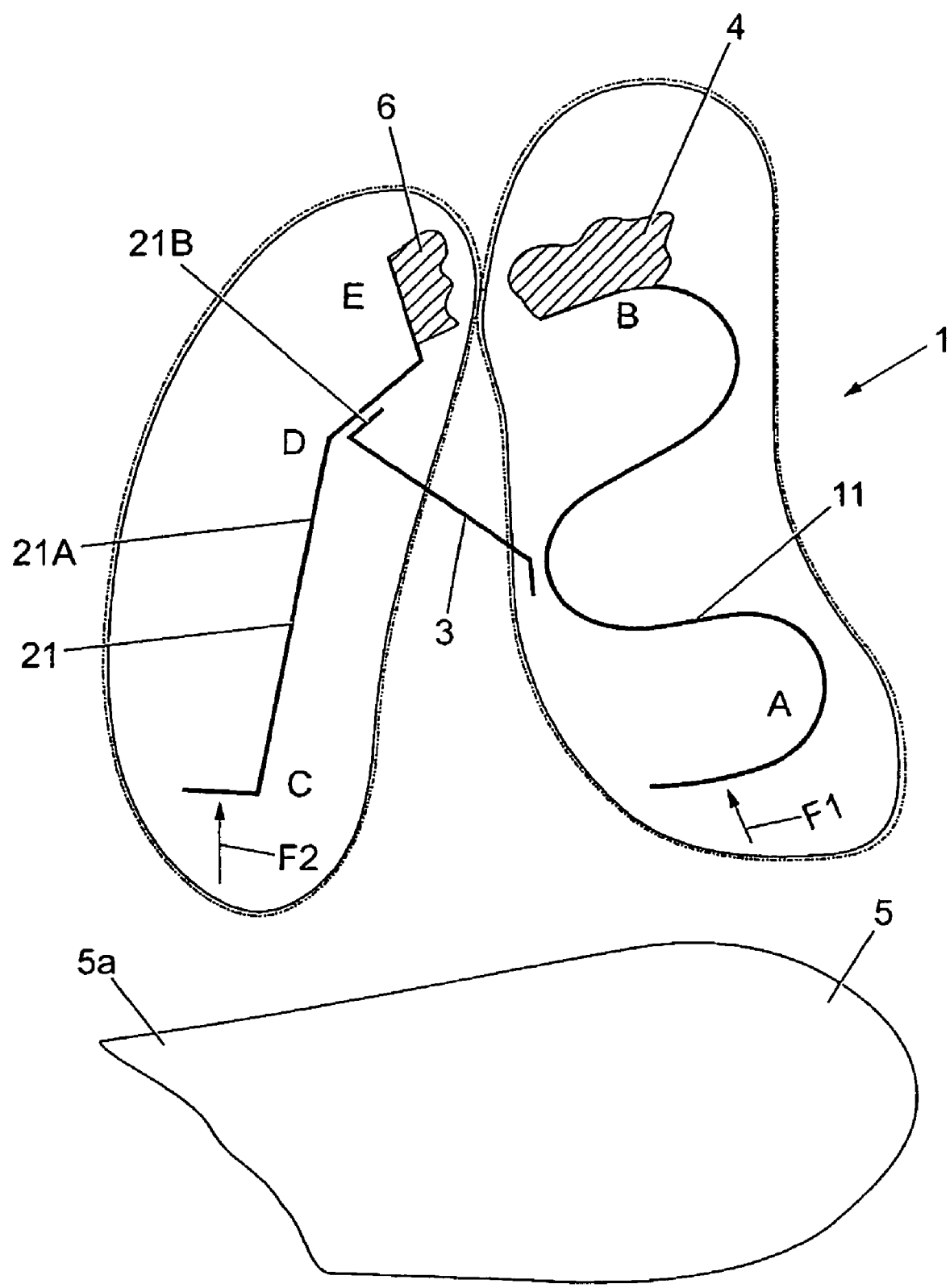
FIG. 1 shows a first embodiment of the knee support element according to the present invention.

FIG. 1 shows a first embodiment of the knee support element 1 according to the present invention. The knee support element comprises a first deformation element 11, a second deformation element 21 and a linking member 3. A first end of the first deformation element 11 is connected to a support element 4 of a motor vehicle, such as a car. This support element 4 is for instance the cross car beam (CCB). The second end of the first deformation element 11 provides a first impact zone A. In FIG. 1 with F1 an impact force exerted by knee 5 on the first impact zone A is schematically indicated.

Second deformation element 21 is with one end thereof connected to a support element 6 of a motor vehicle. This support element 6 can also be the cross car beam or it can be another support element of a motor vehicle. The other end of the second deformation element provides a second impact zone C. With F2 the force exerted by the knee 5 or the tibia 5a on the second impact zone C is schematically indicated. The first impact zone A of the first deformation element 11 is positioned to be in the area to essentially support an impact of a 50% or a 95% dummy. The impact zone can also be positioned in order to be in-between the impact zone of a 50% dummy and a 95% dummy.

The second impact zone C is essentially positioned in order to support impact of the knees of a 5% dummy.

As indicated below in FIG. 2, the first and the second impact zone C can be connected by means of a force distribution plate. That means that an impact in-between the first and second impact zone can be evenly distributed to the respective impact zones A, C.

With reference to FIG. 1, in case the knees 5 of a 50% dummy impact on the first impact zone A, the first deformation element will be deformed. Because of this deformation, the first deformation element is able to absorb the energy exerted by the knees 5 upon the first deformation element 11. Because of the linking member 3 the deformation of the first deformation element 11 will cause a deformation of the second deformation element 21. As indicated in FIG. 1, the second deformation element 21 consist of a first part 21a in-between the second impact zone C and point D and a second element 21b in-between point D and the connection of the second deformation element with the car support element 6.

Upon impact on the impact zone A, the deformation of the first deformation element 11 will be transported via the liking member 3 to displace point D and thereby move the second impact zone C in a direction away from the impact area of the tibia.

The effect of this measure is that in case the tibia 5a of a passenger will impact on the second impact zone C, the resistance against this impact will be relatively low and will not exceed the forces and limitations which might lead to a fracture of the tibia.

In case the knees, for instance of a 5% dummy, would directly have impact on the second impact zone C, the presence of the second deformation element 21 will provide sufficient resistance in order to decelerate the knees without exceeding the limitations and forces which might lead to fracture of the knees. Also in this case the linkage between the first deformation element 11 and the second deformation element 21 will help to protect the passenger. The deformation of the second deformation element 21 will, because of the linking member 3, also cause a deformation of the first deformation element 11.

Depending on the dimensions of the car and the materials used, the first deformation element 11, the second deformation element 21 and the linking member 3 and the relative position thereof can be tuned in order to provide optimal protection for impact of a passenger of any size without risking to exceed forces and limitations which might lead to fractures of the legs of the passenger.

Figure 2:
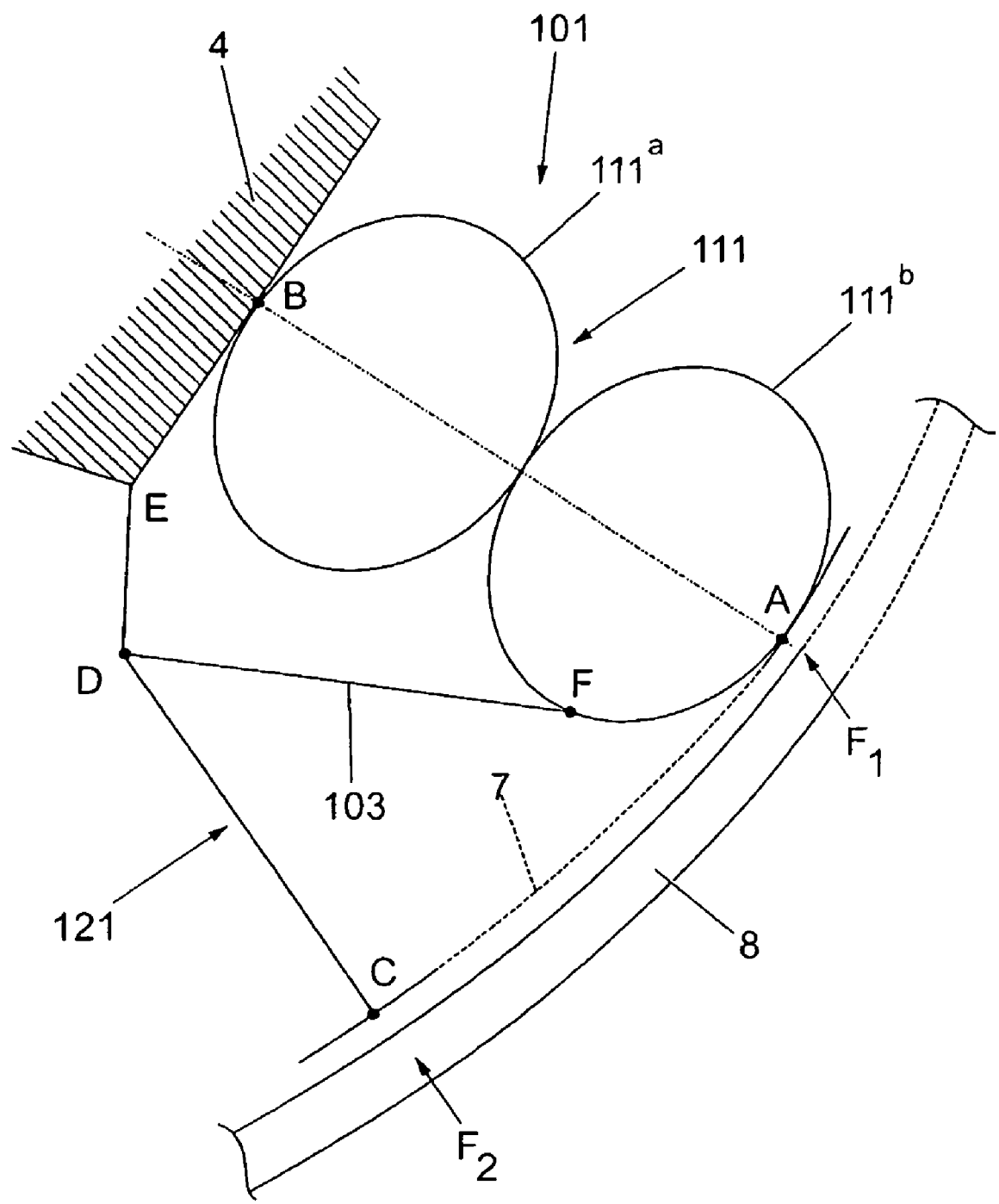
FIG. 2 shows a second embodiment of the knee support element according to the invention.

FIG. 2 shows an alternative embodiment of the knee support element according to FIG. 1. The knee support element 101 according to FIG. 2 comprises a first deformation element 111 comprising a first 111a and a second 111b cylindrical element. A first end of the first deformation element 111 is connected to a rigid part of the car, such as the cross car beam 4. This connection is indicated with point B. The other end of the first deformation element 111 provides a first impact zone A. The knee support element 101 according to FIG. 2 further comprises a second deformation element 121, with one end thereof connected to the cross car beam 4 and wherein the other end provides a second impact zone C.

Similar to embodiments according to FIG. 1, the first deformation element 111 and the second deformation 121 are connected by means of a linking member 103.

The impact zones A and C are interconnected by means of an additional connecting element 7 indicated by means of dotted line, or by a force distribution plate. Moreover the force distribution plate 8 is shown which is connected to the knee support element 101.

Figure 3:
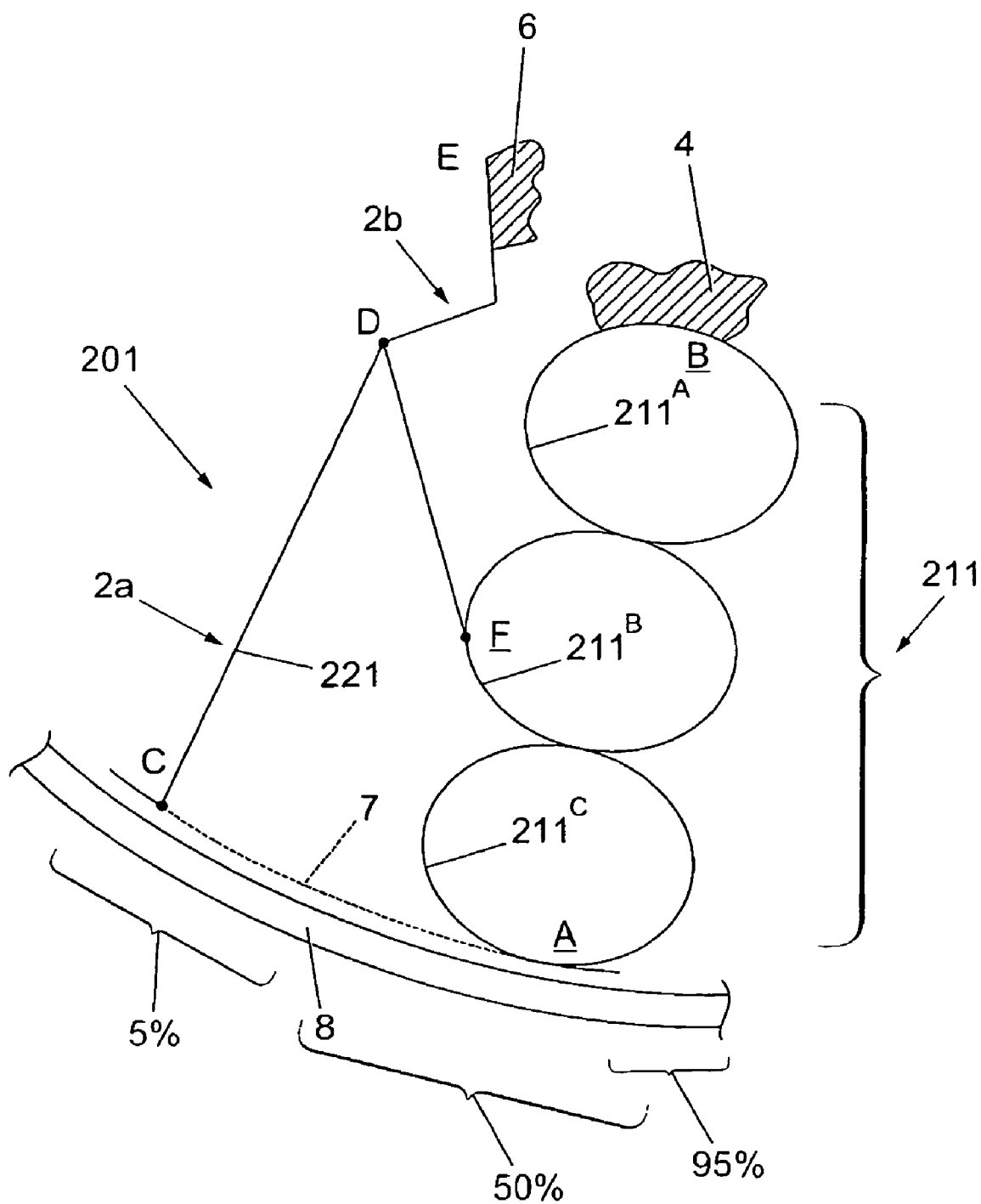
FIG. 3 shows a third embodiment of the knee support element according to the present invention.

FIG. 3 shows a third embodiment 201 of the knee support element according the present invention. The knee support element 201 according to FIG. 3 comprises a first deformation element 211, comprising a first 211a and a second 211b and a third 211c cylindrical element. Similar to FIG. 2 the first deformation element 211 is with one end thereof connected to a car cross beam 4 while the other end provides an impact zone A.

Moreover the element 201 comprises a second deformation element 221. The second deformation element 221 with one end thereof is connected to a rigid part 6 of a vehicle. The other end provides a impact zone C. Similar to FIG. 2, the impact zone A and C can be connected by an additional connecting element 7. Moreover the force distribution plate and the instrument panel 8 are shown.

As indicated in FIG. 3, the first impact zone, is essentially in the 50%-95% dummy area. The second impact zone C is provided in the 5% impact zone.

The knee support element according to FIGS. 2 and 3 can be produced from any suitable material such as aluminium, steel, magnesium, plastic or any combination thereof. The elements can for instance be produced by means of extrusion, die-casting, stamping, deep drawing, moulding, roll forming.

Figure 4:
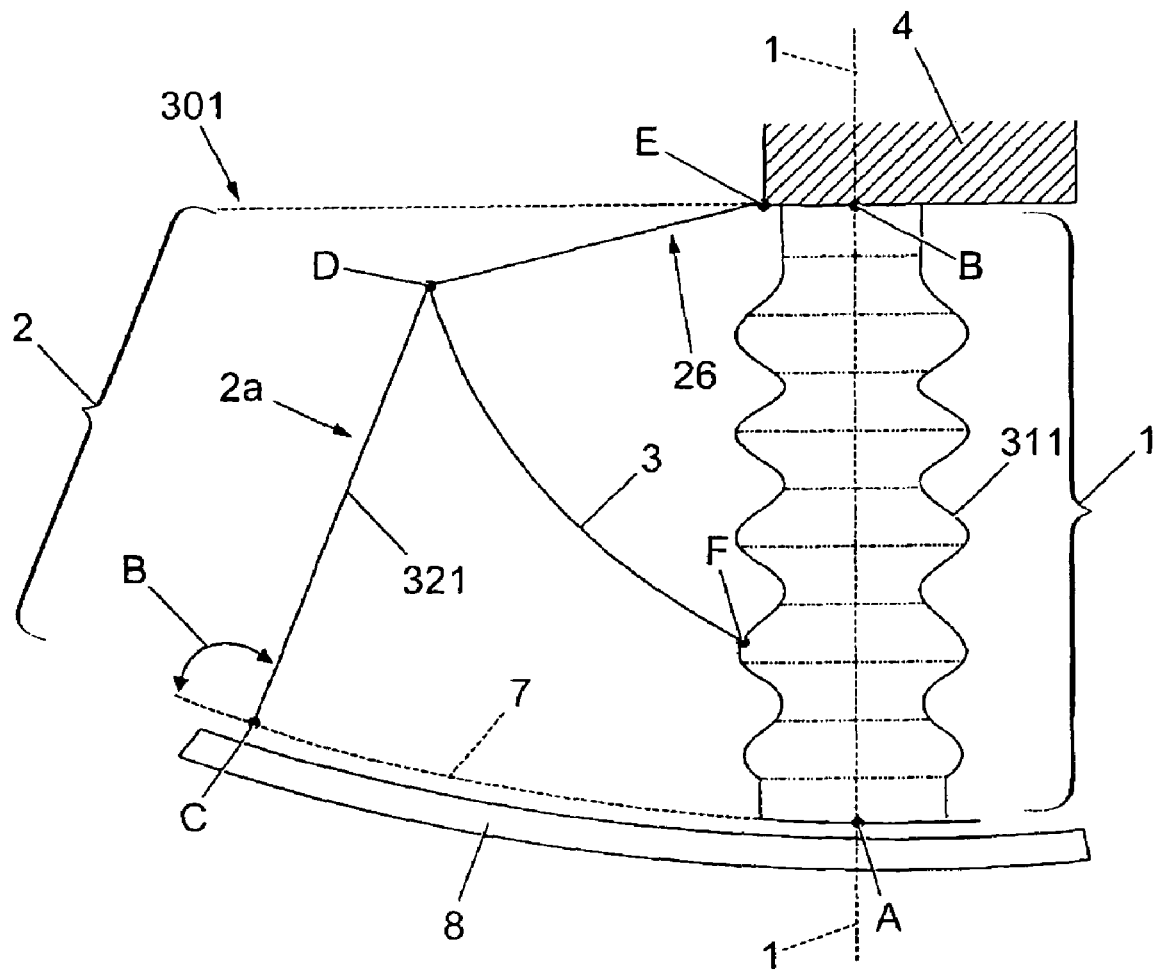
FIG. 4 shows a fourth embodiment of the knee support element according to the present invention.

FIG. 4 shows a further alternative for a knee support element 301, according to the present invention. The firs deformation element 311 is basically shaped as cylinder having corrugate walls. The second deformation element 321 has a shape of a wall. Linking member 3 connects the second deformation element with the first deformation element.

Figure 5:
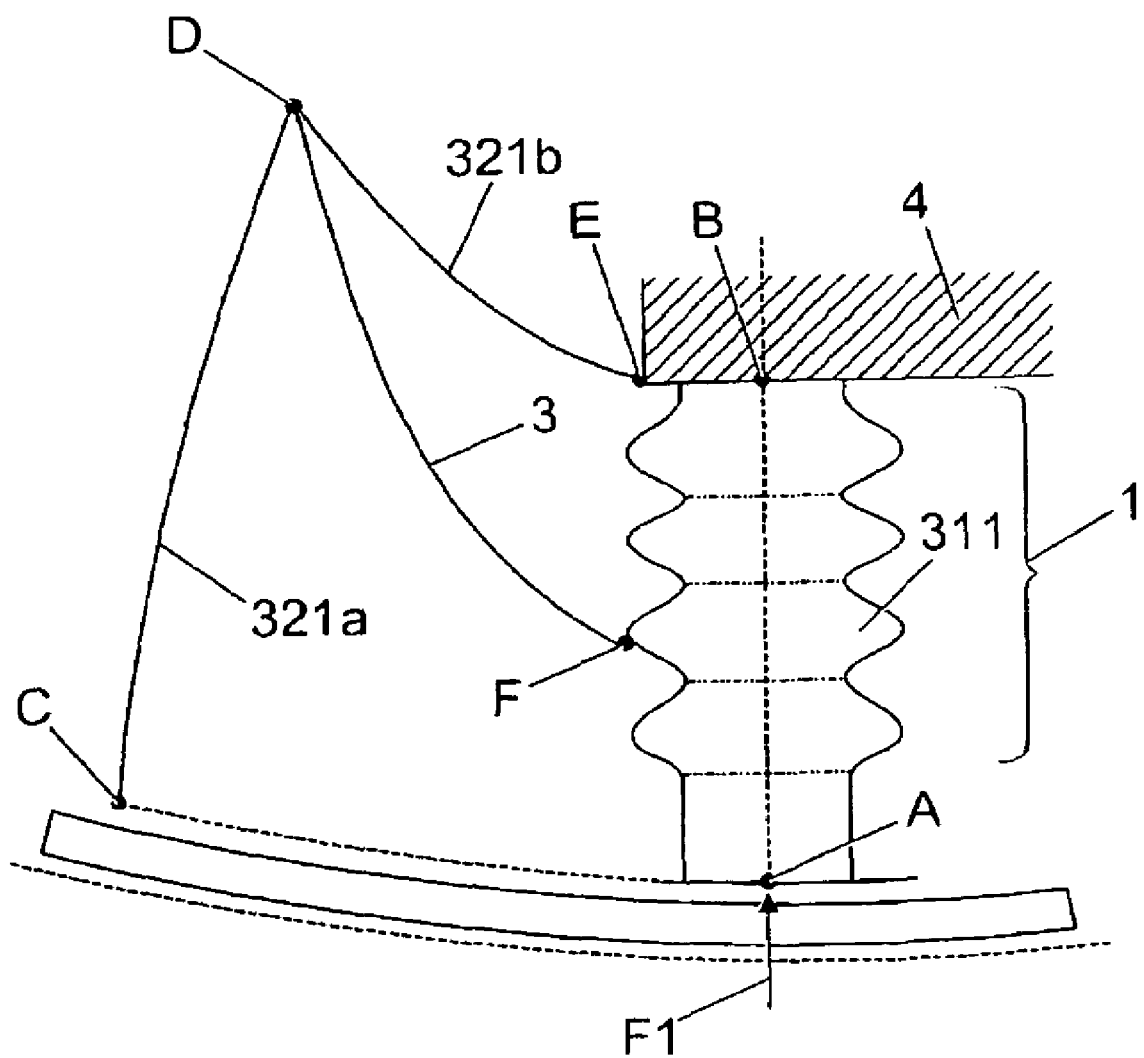
FIG. 5 shows the knee support element according to FIG. 4 where by pressure is exerted on the first impact zone in order to deform the first deformation element.

In FIG. 5 the effect of an impact, F1, exerted on the first impact zone A is shown. Because of the impact F, the first deformation element 311 is deformed. This deformation will have the effect that point F is moved towards the cross car beam 4. Because of the interconnection of the walls 321a and 321b and 3, the interconnecting point D will move in the direction away from the impact F1. Because of this movement the second impact zone C will move in a direction away from the impact F1. That means that in case F1 is generated by the knees of passenger, the lower tibia will be protected by means of the movement of the impact zone in order to limit the forces exerted on the tibia upon impact.

Figure 6:
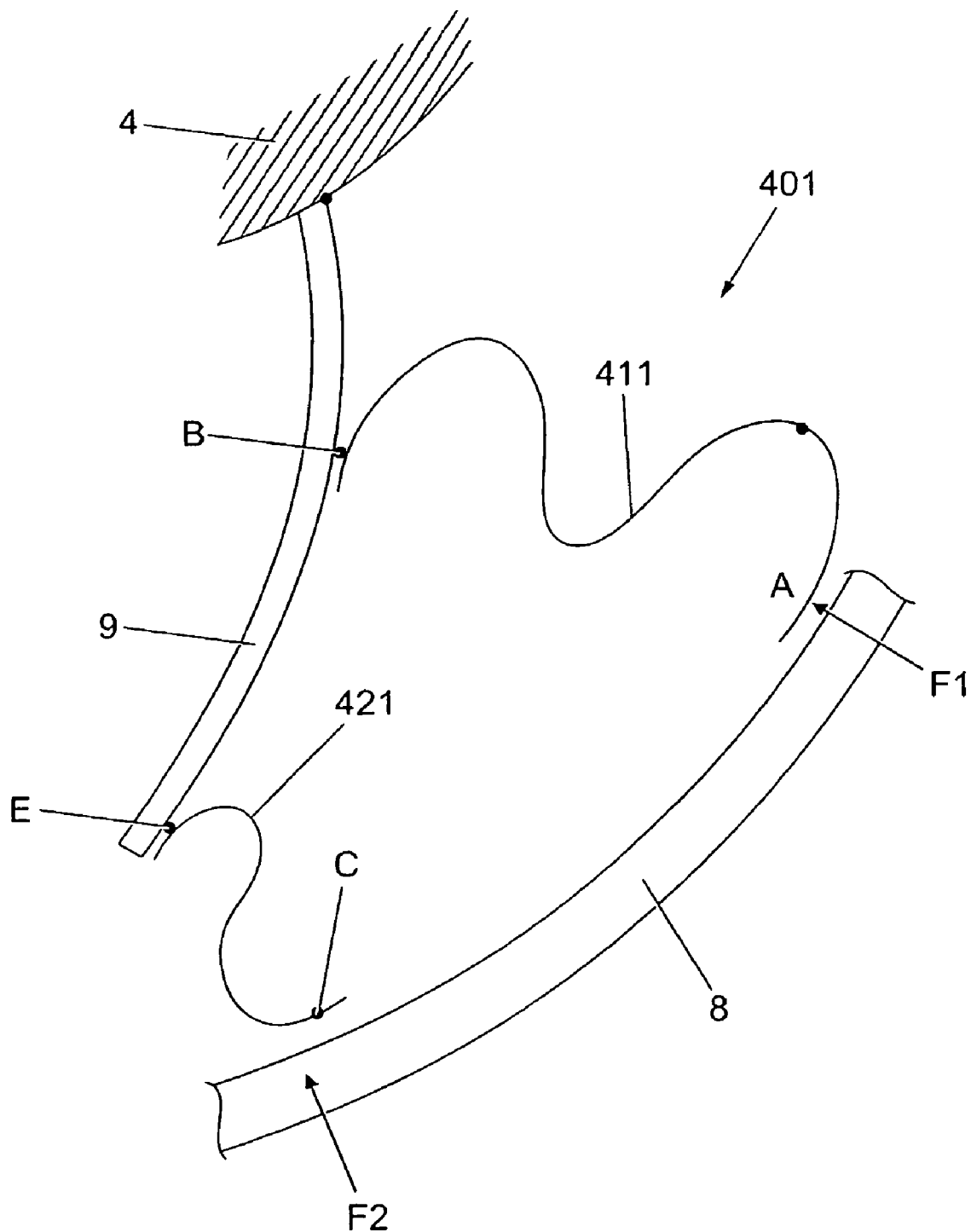
FIG. 6 shows a further embodiment of the knee support element according to the present invention.

FIG. 6 shows an alternative embodiment of a knee support element 401. The knee support element 401 comprises a first deformation element 411 and a second deformation element 421. Both the first 411 and the second 421 deformation elements are connected at one end thereof to the force distribution plate and instrument panel 8. The other end thereof is connected to a support member 9. The support member 9 with one end thereof is connected to the rigid part of the motor vehicle, such as the cross car beam 4.

Similar to the FIG. 1-5, upon impact of the knees in the first impact zone A, the first deformation element 411 will be deformed thereby displacing point B on member 9. The displacement of point B will result on a displacement of point E away from the impact direction of the force on the impact zone A. Because of the displacement of point E the connected second deformation element 421, would be moved away in a direction away from the impact on the first impact zone A.

Figure 7:
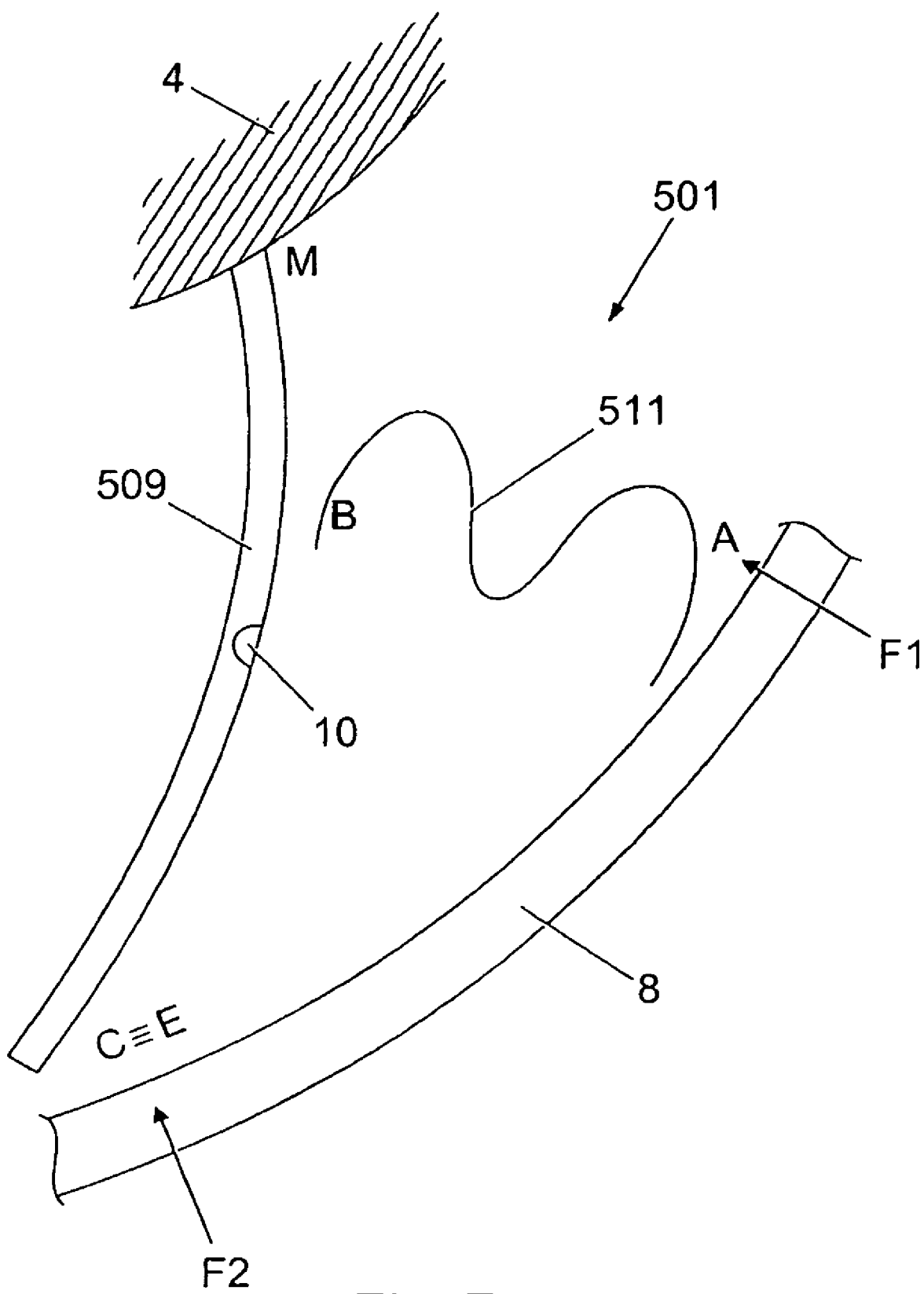
FIG. 7 shows a further embodiment of the knee support element according to the present invention.

FIG. 7 shows a further embodiment of knee support element 501, similar to the element 401 according to FIG. 6.

The support element 501 comprises a first deformation element 511 which is provided between the instrument panel 8 and a support member 509. The support element 509 is connected to the cross car beam 4. A second impact zone C is created on a further end of the support member 509 in case impact is received on the first impact zone A, the support element 509 will rotate and thereby displace the second impact zone C in a direction away from the impact received on impact zone A.

In FIG. 7, by means of reference number 10 a notch is indicated. This notch can be used in order to fine tune the resistance against deformation of the member 509. It is clear that such a notch can also be used in one of the other elements in one of the embodiments shown on the knee support according to the present invention.

Figure 8:
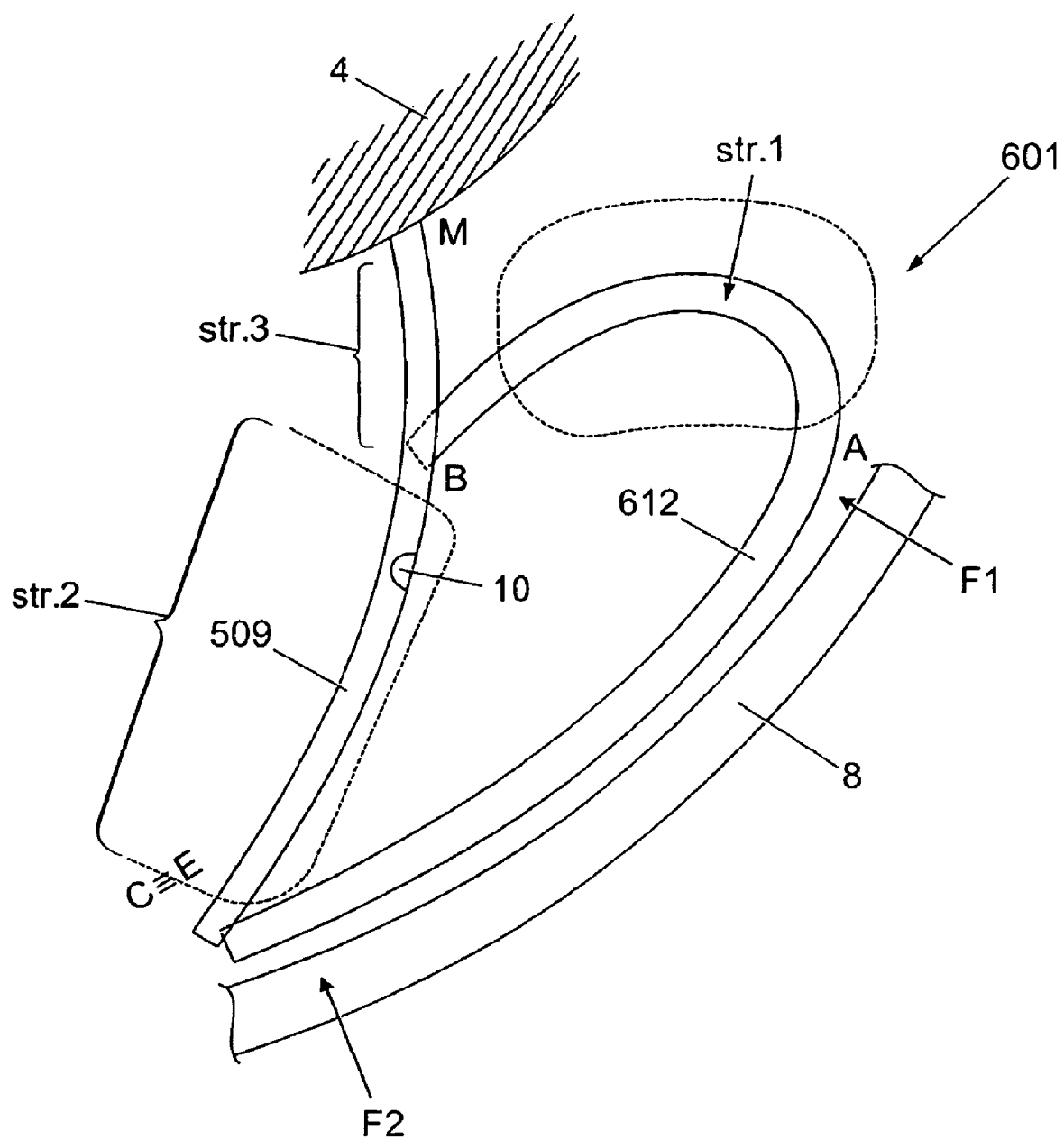
FIG. 8 shows a further embodiment of the present invention.

FIG. 8 provides a further embodiment of a knee support element 601 according to the present invention. Similar to FIG. 7 a support member 509 is connected to a car cross being for to the support member 509 a single element 612 is provided. This element 612 provides a deformation zone in between the first impact zone A and the connection B of the element 612 and the support member 509. In FIG. 8 also the instrument panel and the force distribution plate are schematically indicated.

Figure 9:
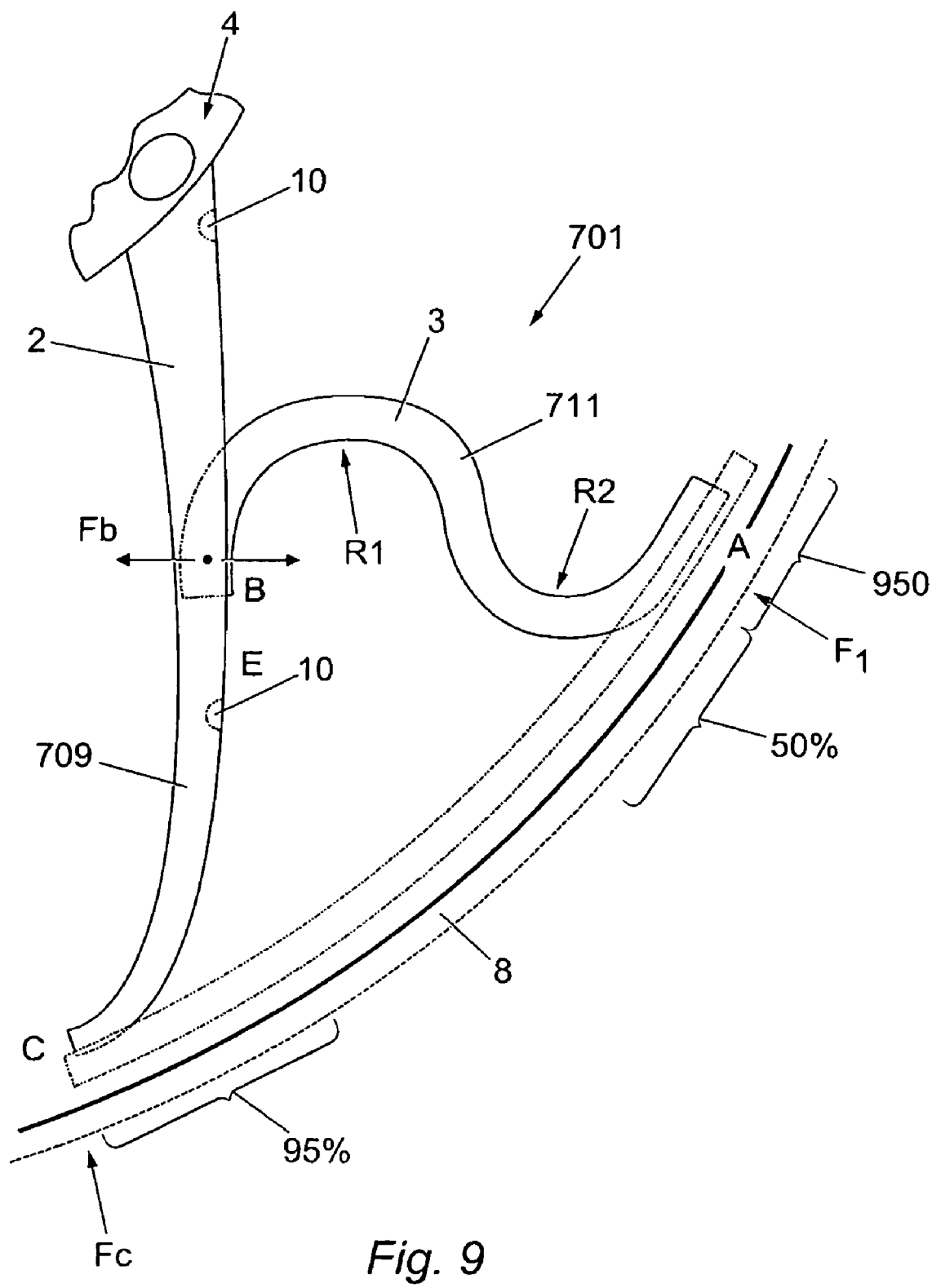
FIG. 9 shows a further embodiment of the present invention.

FIG. 9 provides a further embodiment of a knee support element 701 according to the present invention.

The knee support element 701 comprises a support member 709. A first deformation element 711 is provided in between the first impact zone A and a connected point B which connect the first deformation element 711 with the support member 709. In the support element 709 two notches 10 are provided in order to fine tune the resistance of this member 709 against deformation. The impact zones A and C are interconnected by a means a fourth distribution plate 7 (indicated by dotted lines) and the instrument panel 8. Moreover possible positions for the 5%, 50% and 95% dummies impact zones are also indicated.

Figure 10:
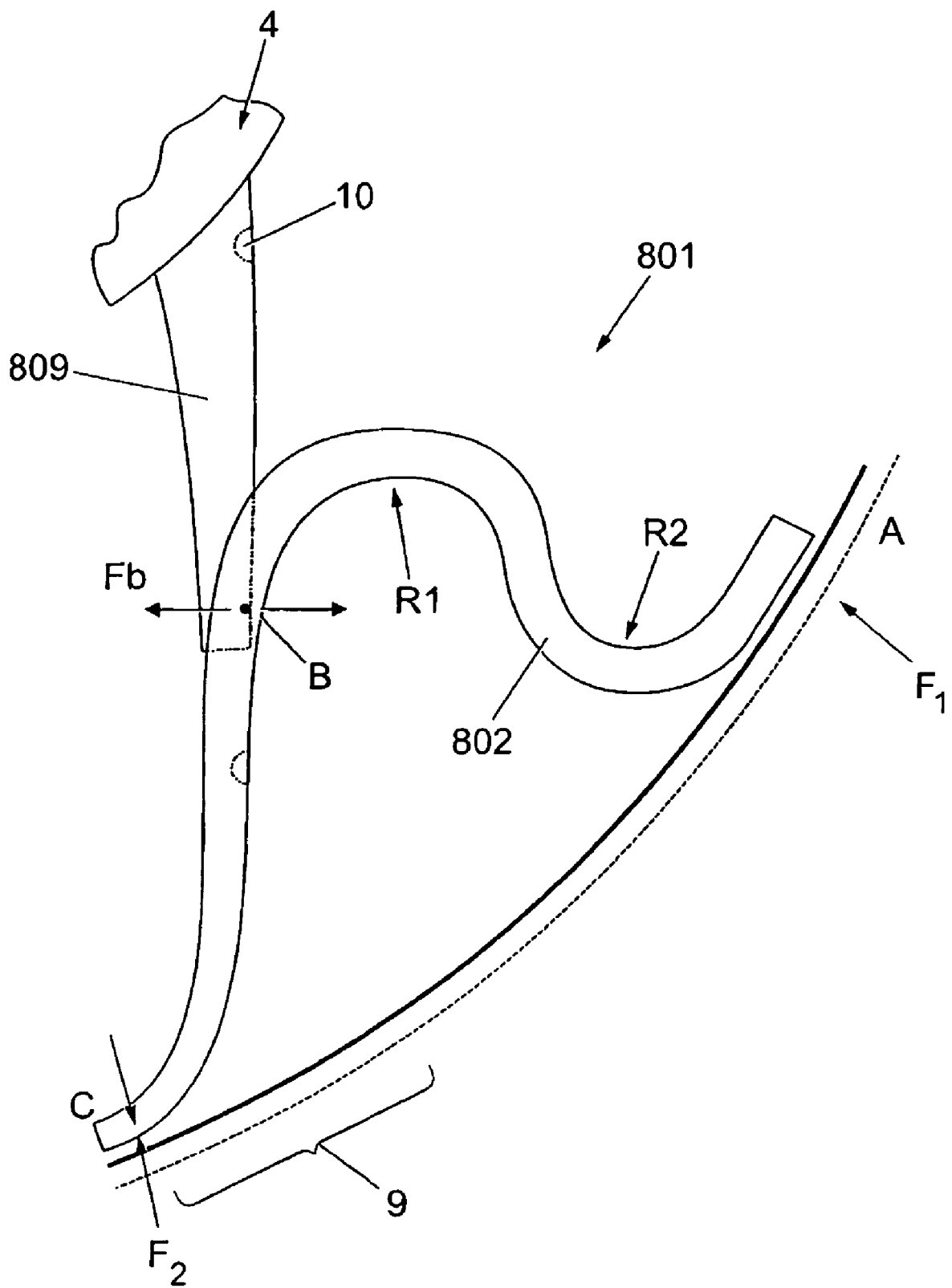
FIG. 10 shows a further embodiment of the knee support brackets according to the present invention.

An alternative embodiment is indicated in FIG. 10. The knee support element 801 comprises a first element 802 which provides in between the impact zone A and point B a first deformation element. The continuation of element 802 is connected to the second impact zone C. The support element 809 connects element 802 with a rigid part 4 of the motor vehicle. The resistance of the element according to FIG. 10 can be fine tuned, for instance, by alternating the curvature of the element 802.

Figure 11:
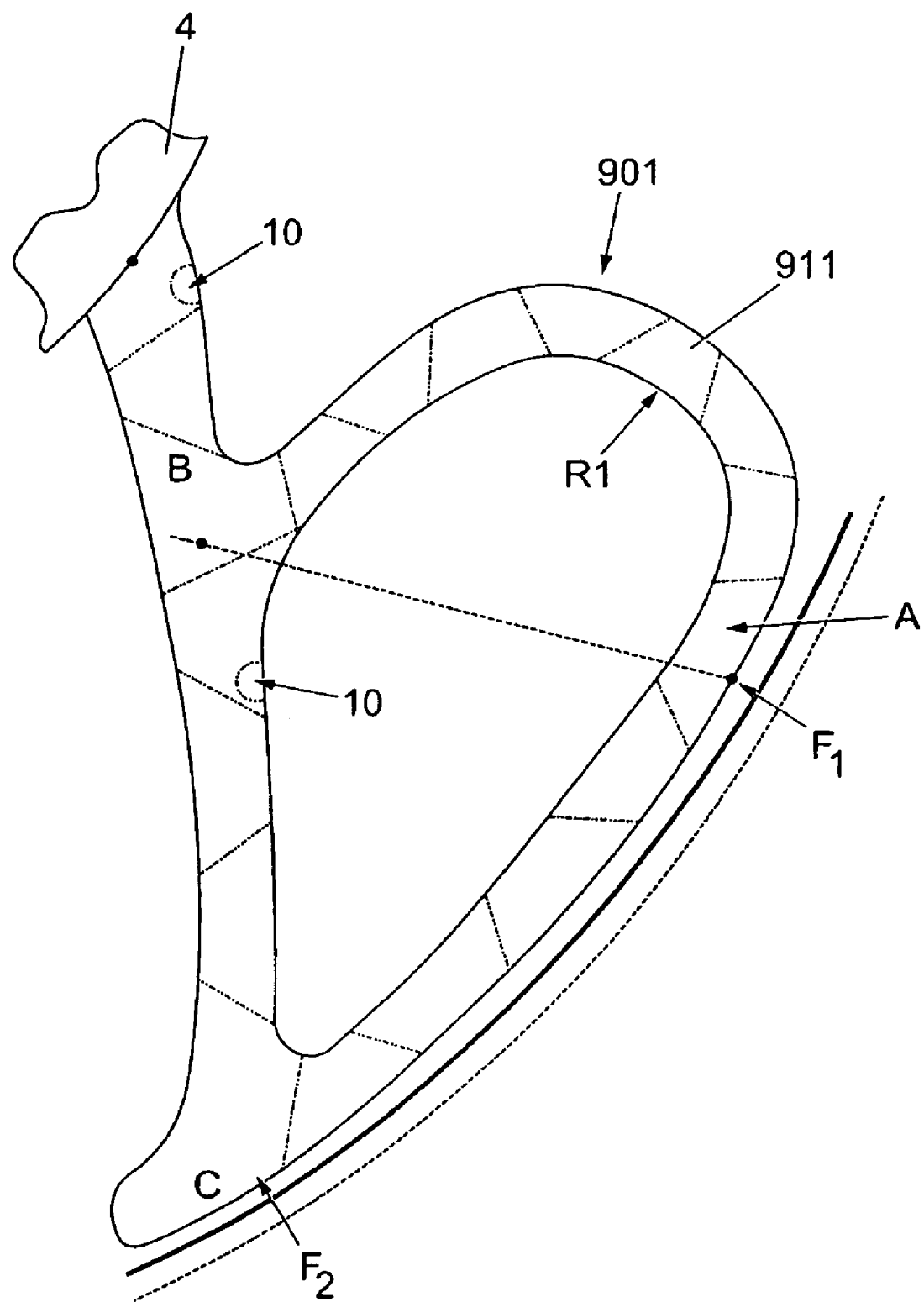
FIG. 11 shows an embodiment of the knee support structure according to the present invention consisting of a single bracket.

FIG. 11 shows a further embodiment of a knee support element 901 according to the present invention. The knee support element 901 is a single element which provides in between the impact zone A and point B a first deformation element 911. Upon impact of a force in the first impact zone A, the knee support element will rotate with respect to the rigid car part 4. The element between the impact zone A and C provides a local force distribution. In FIG. 11 also the instrument panel and the force distribution plate are schematically indicated.

With reference to the figures indicated above, it is noted that the resistance of the first and second deformation element and thereby the ability to absorb forces can be easily tuned by modifying the shape, the material, the thickness and the links of the whole as indicated in the figures. Not only the amount of forces received on the brackets, but also the angle or directions thereof can be fine tuned by amending the form, depending on the specific dimension of a motor vehicle.

The invention claimed is:

1. Knee support element for motor vehicles for absorbing energy in a knee region in case of a crash of the vehicle, comprising
   a first deformation element for absorbing energy upon impact of the knees of an occupant in a first impact zone and
   a second deformation element for absorbing energy upon impact of the knees of said occupant in a second impact zone,
   wherein the first deformation element is linked to the second deformation element in order to move the second deformation element in a direction away from the tibia of said occupant upon impact of the knees of said occupant on the first impact zone.

2. Knee support element according to claim 1, wherein the first deformation element and the second deformation element are a first part and a second part of a single support bracket.

3. Knee support element according to claim 1, wherein the first and the second deformation element comprise one single material.

4. Knee support element according to claim 1, wherein the first and the second deformation element comprise a first and a second material.

5. Knee support element according to claim 1, wherein the first and/or second deformation element comprise steel.

6. Knee support element according to claim 1, wherein the first and/or second deformation element comprise aluminium.

7. Knee support element according to claim 1, wherein the first and/or second deformation element comprise magnesium.

8. Knee support element according to claim 1, wherein the first and/or second deformation element comprise a plastic, foam, or rubber.

9. Knee support element according to claim 1, wherein the first and/or second deformation element comprise a spring.

10. Knee support element according to claim 1, wherein the first deformation element is provided with connecting means for connecting the first deformation element to a support element of a motor vehicle.

11. Knee support element according to claim 10, wherein the second deformation element is provided with connecting means for connecting the second deformation element to a support element of a motor vehicle.

12. Knee support element according to claim 11, wherein the first and second deformation element are provided with a single connecting element for connecting the first and the second deformation element to a support element of a motor vehicle.

13. Knee support element according to claim 10, wherein the first and/or second deformation element is connected to the cross-car-beam (CCB).

14. Knee support element according to claim 10, wherein the first and/or second deformation element is connected to the car body.

15. Knee support element according to claim 1, wherein the first and/or second deformation element connected to a deformable bracket which is attached to the cross-car-beam, or the car body.

16. Knee support element according to claim 1, wherein the first impact zone and the second impact zone are linked by means by a force distribution plate.

17. Knee support element according to claim 16, wherein the first impact zone and the second impact zone are integrated in the force distribution plate.

18. Knee support element according to claim 16, wherein the force distribution plate is formed by an instrument panel (IP) of the vehicle.

19. Motor vehicle, such as a car, comprising a knee support element according to claim 1, wherein the knee support element is positioned in order to place the first impact zone in the 50% impact area and wherein the second impact zone is placed in the 5% impact area.

* * * * *